(12) United States Patent
Rybka et al.

(10) Patent No.: US 9,521,826 B2
(45) Date of Patent: Dec. 20, 2016

(54) PET HOUSETRAINING CRATE SYSTEM

(71) Applicants: Gary Rybka, Myrtle Beach, SC (US);
Michael Schoeff, Johnstown, OH (US)

(72) Inventors: Gary Rybka, Myrtle Beach, SC (US);
Michael Schoeff, Johnstown, OH (US)

( * ) Notice: Subject to any disclaimer, the term of this patent is extended or adjusted under 35 U.S.C. 154(b) by 0 days.

(21) Appl. No.: 14/460,760

(22) Filed: Aug. 15, 2014

(65) Prior Publication Data
US 2015/0047572 A1    Feb. 19, 2015

Related U.S. Application Data

(60) Provisional application No. 61/866,634, filed on Aug. 16, 2013.

(51) Int. Cl.
*A01K 15/02*    (2006.01)
*A01K 1/03*    (2006.01)

(52) U.S. Cl.
CPC .............. *A01K 1/034* (2013.01); *A01K 15/02* (2013.01); *Y10T 24/44983* (2015.01)

(58) Field of Classification Search
CPC ........ A01K 1/0107; A01K 1/03; A01K 1/033; A01K 1/0245; A01K 1/034; A01K 1/035
USPC ...... 119/165, 472, 161, 452, 482, 28.5, 167, 119/170, 478, 479, 480
See application file for complete search history.

(56) References Cited

U.S. PATENT DOCUMENTS

| | | | | |
|---|---|---|---|---|
| 3,098,465 A * | 7/1963 | Lvey | ...................... | A01K 1/031 119/417 |
| 3,618,568 A * | 11/1971 | Breeden | ................. | A01K 1/033 119/161 |
| 3,757,990 A * | 9/1973 | Buth | ....................... | B44D 3/126 206/223 |
| 4,312,295 A * | 1/1982 | Harrington | .......... | A01K 1/0114 119/167 |
| 4,813,376 A * | 3/1989 | Kaufman | ............. | A01K 1/0125 119/168 |
| 4,846,103 A * | 7/1989 | Brown | ................. | A01K 1/0125 119/168 |
| 5,092,270 A * | 3/1992 | Simons | ................ | A01K 1/0245 119/165 |
| 5,184,568 A * | 2/1993 | Healey | ................. | A01K 1/0107 119/165 |
| 5,738,040 A * | 4/1998 | Simmons | ............. | A01K 1/0107 119/163 |
| 6,286,458 B1 * | 9/2001 | Rawson | ............... | A01K 1/0107 119/161 |
| 7,827,940 B2 * | 11/2010 | Silverman | ............. | A01K 1/034 119/474 |
| 8,240,274 B2 * | 8/2012 | Greene | .................. | A01K 1/033 119/453 |

(Continued)

*Primary Examiner* — Yvonne Abbott-Lewis
(74) *Attorney, Agent, or Firm* — Okuley Smith LLC

(57) ABSTRACT

A system for housetraining pets through the use of separated sleeping and waste areas contained within a pet cage. The cage encloses a waste tray section that runs along the floor of the cage, which holds an absorbent pad, secured by improved retention clips, for collecting pet waste that can be removed and replaced when soiled. A bedding area made up of a rectilinear frame covered in bedding material is raised above the floor of the cage by engaging frame extensions with perforations in the exterior of the cage. The system and associated method serve to aid in conditioning a pet for proper housetraining while the pet is confined to a cage.

20 Claims, 7 Drawing Sheets

(56) References Cited

U.S. PATENT DOCUMENTS

| | | | | |
|---|---|---|---|---|
| 8,443,760 B2* | 5/2013 | Bailey | .................. | A01K 1/0356 119/472 |
| 8,733,292 B2* | 5/2014 | Nichols | .................... | A01K 1/03 119/452 |
| 2001/0054394 A1* | 12/2001 | Marchioro | ........... | A01K 1/0245 119/452 |
| 2010/0300367 A1* | 12/2010 | Askinasi | .............. | A01K 1/0157 119/161 |
| 2011/0168104 A1* | 7/2011 | Matteson | ................. | A01K 1/03 119/472 |
| 2012/0210947 A1* | 8/2012 | DiPaolo | ................. | A01K 15/02 119/472 |

* cited by examiner

PET HOUSETRAINING CRATE SYSTEM

CROSS-REFERENCE TO RELATED APPLICATIONS

The application claims priority to U.S. Provisional Patent Application Ser. No. 61/866,634, filed Aug. 16, 2013, the disclosure of which is hereby incorporated by reference.

STATEMENT REGARDING FEDERALLY SPONSORED RESEARCH

Not applicable.

BACKGROUND

Dogs are very common pets for families. Many families, however, are not able to keep constant supervision of their dogs, necessitating the pets to be left alone for several consecutive hours, several days per week. It is common for families to leave dogs confined to a cage during these unsupervised hours. Extended time in a cage can prove difficult for puppies that are yet to be properly housetrained. Puppies that have not yet been fully housetrained can have erratic bathroom schedules. Puppies often use the bathroom once per two hours. Families who must leave a puppy confined to a cage for several hours at a time multiple days per week cannot properly accommodate the puppy's needs in a traditional dog crate or cage.

During the housetraining process, puppies are conditioned to learn which areas are appropriate for the puppies to leave their waste. Often an owner will reward a puppy when it leaves its waste in an outdoor area, while punishing it when waste is discovered in a living area. This process conditions the puppy to develop a clear delineation between areas that are suitable for waste, and those that are meant for living or sleeping. Traditional dog crates and cages do not contain separated areas. The housetraining process can be stunted when a puppy is confined to a traditional cage, and may have to relieve itself in the same area in which it sleeps. A dog cage that has an area specifically for sleeping, separated from an area where a puppy can relieve itself, can help reinforce the conditioning of which areas the puppy is allowed to leave its waste. Cages that do not have a delineated area for pet waste can also result in the puppy regularly soiling its bedding or toys. A lack of delineation can also affect a puppy's mood, as dogs have a natural instinct to avoid leaving their waste in living or sleeping areas.

There is a large market for pet beds for use in dog cages or crates. Many products in the market involve a bed or blanket that is placed on the floor of the cage or crate. The bed is intended to provide a comfortable sleeping area on the floor of the cage. Dogs, however, often prefer to sleep in elevated areas when given the choice. There are few pet beds or sleeping products that provide dogs with an elevated sleeping area in a dog crate or cage. For dogs that must spend extended time in a crate or cage, a comfortable and naturally enticing sleeping area is crucial.

A number of previous dog cages include removeable dog beds. U.S. Pat. No. 2,900,956 discloses a cage containing an insertable and removable cot comprising a pallet suspended between rails, with leg units supporting the rails. See also U.S. Pat. No. 2,980,058, which is also discloses a heating element added to the cot.

Another example of cages for pets includes U.S. Pat. No. 3,246,630, disclosing a sanitary facility for household pets with a rear toilet compartment and a open front compartment. This pet crate with a separated area for pet waste is typical of cages that are designed for cats, and it is well known that litter training cats and house training dogs require very different types of behavioral reinforcement. The type of training disclosed in U.S. Pat. No. 3,246,630 is actually undesirable for proper training of dogs.

A number of other disclosures of elevated beds include U.S. Pat. No. 6,397,778 and U.S. Pat. No. 7,267,077. These patents disclose elevated pet beds for the purpose of easing the cleaning of the pet cage, but do not suggest using the beds as part of a training system for conditioning dog behavior.

A vast variety of other dog training systems are available, including a number of systems such as that disclosed in U.S. Patent Publication 2008/0264348 "Puppy Training System," and U.S. Patent Publication 2012/0210947 "Puppy Apartment." These publications describe separate detachable enclosures that may provide unwanted conditioning for a pet to relieve bodily functions within an enclosure.

Some products in the industry do attempt to provide dogs and puppies with an area in a cage or penned area where it is appropriate for the pet to leave its waste. Many of these products employ an absorbent pad, which often has adhesive to attempt to restrict the pad's movement. As dogs often have an instinct to scratch and paw at the ground where they have recently relieved themselves, the pads can become dislodged and create a mess of the dogs' waste.

A system designed to address all the issues discussed above would be a novel product in the industry. Such a system would provide an ideal method for providing a comfortable environment for dogs and puppies who must spend extended hours in a cage or crate, while also reinforcing the conditioning required for the housetraining process.

BRIEF SUMMARY

The present invention provides a system for housetraining animals such as dogs and puppies, contained within a wire pet cage. The preferred use of the system is with puppies that must regularly reside in a cage for extended periods of time. The cage contains a system made up of an elevated pet bed created for use with the system, an absorbent pad made to hold and trap a pet's waste, a plastic base to hold the absorbent pad, and a series of metal clips designed to secure the absorbent pad to the base. The system as described will aid the conditioning of young dogs that must be kept in a cage for extended periods of time, so that the dogs can be trained as to which areas are appropriate for the dog to leave its waste.

The preferred embodiment of the system is to contain the system in a wire pet cage that is suitable for small to medium sized dogs and puppies. The elements of the systems are meant to separate the cage into an area for sleeping, and an area where it is appropriate for the dog to leave its waste. The sleeping area contains a raised pet bed, which provides the dog with an elevated location for sleeping, a characteristic that is preferable for dogs.

The sleeping area is made up of a rectilinear frame wrapped in an appropriate bedding material. Each corner of the frame has an extension that can fit within perforations in the exterior of the cage, to lift the bedding platform above the floor of the cage. Leg pieces may also be inserted into the frame extensions as an alternative method of lofting the bedding area. A further embodiment comprises using the bedding platform and leg pieces to elevate the bedding platform for use outside the cage, or as a separate lofting platform.

The pet waste area sits on the floor of the wire cage. A hard plastic base is placed on the floor of the cage. An absorbent pad is laid inside the plastic base. The pads can be made of a variety of materials that are suitable for capturing a pet's waste. The absorbent pad is secured to the plastic base by a series of metal clips that are specifically designed to fit and hold tightly against the plastic base. The clips can be easily removed and replaced each time the absorbent pad is soiled and another pad must be utilized.

The character of the present invention serves to aid in the conditioning of dogs and puppies that are being house-trained, even if the dogs must remain in a cage for extended hours. The system teaches the dog that certain areas are suitable for receiving waste, while other areas are to be kept clean. The system also caters to the dog's instincts and preferences to create a system where the dog can live comfortably for relatively long periods of time.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION

Figure 1:
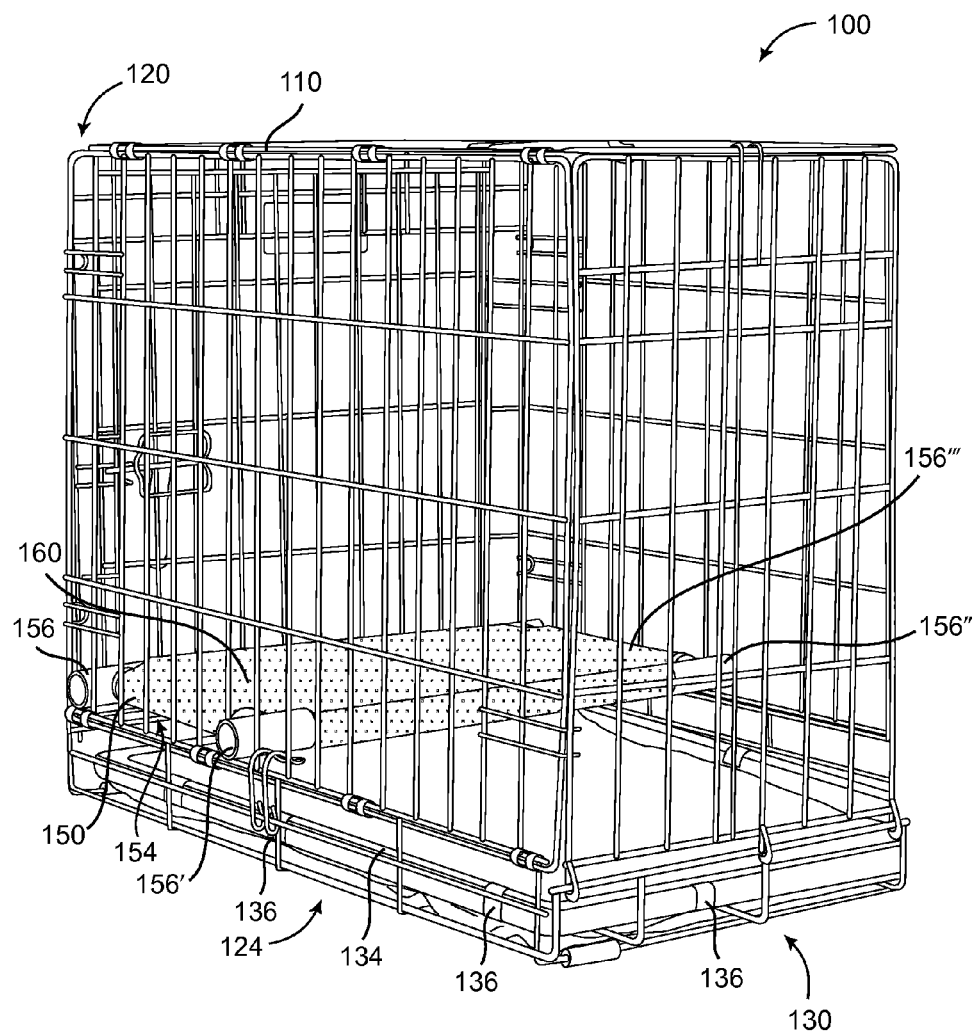
FIG. 1 depicts a perspective view of the full system as seen from the rear of the cage.

FIG. 1 shows a full view of the system 100, as seen from the rear of the cage. The system is made up of the waste tray section of the system and the bedding section of the system. Both sections of the system are enclosed within the frame of the cage 110. The cage as depicted is a metal wire-frame cage, with a door 120 present on the opposite end from the view depicted. Alternatively, the cage could be made of other materials, such as plastic or wood. The side panels of the cage must provide for perforations to support the bedding platform contained within the system. In the preferred embodiment, the rungs of the wire cage serve as appropriate perforations.

The waste tray section is comprised of a base plastic tray 130, an absorbent pad 134, and a plurality of metal clips used to secure the pad to the tray 136. The tray 130 is made of a hard plastic, with a raised edge around the entirety of the tray to assist in securing the absorbent pad. The absorbent pad 134 sits on top of the base tray. In the preferred embodiment, the pad is made of a combination cotton and paper material, or a similarly absorbent material. The absorbent pad functions as an elimination surface. The pad is disposable and is able to be replaced each time it is soiled. The pad is secured to the tray through a plurality of metal clips 136. The clips are curved with a gradual bend on one end, and a sharp bend on the opposite end, which conforms to the raised edge of the base tray. The whole waste tray section of the system sits on the floor of the cage.

The bedding section is comprised of a bedding platform 150, which is wrapped in bedding loft material 160 that extends around the platform. The platform is made up of several pieces of structural framing that create the rectilinear frame of the platform. In the preferred embodiment, the frame is made of PVC piping, but other plastic or metal tubing can be used. The frame consists of two longer pieces of piping running parallel, the side frame members, and two shorter pieces of piping running parallel, the end frame members. The side frame members and end frame members are joined by connecting pieces. In the preferred embodiment, the connecting pieces are T-shaped pieces. Each connecting piece has a projection (156, 156', 156", 156'''), which allows the frame to pass through the cage perforations and sit above the floor of the cage. In an alternate embodiment, the T piece is connected to detachable leg pieces, which serve to raise the platform above the floor of the cage.

The pet bed 160 is created by wrapping an appropriate bedding material around the rectilinear bed frame. In the preferred embodiment, the bedding is made using a nylon fabric material. The bed may also be made using cotton fabric or several other suitable materials. In the preferred embodiment, the bedding material consists of a single piece of material, which is wrapped around the 4 sides of the bed frame, and sewn back onto itself. Thus, the entirety of the bed frame, except for the connector pieces, is covered by the material. The bedding material in the form of a fabric bedding panel can also be secured to the frame using hook-loop fasteners, i.e. Velcro™, or be securable to the frame with an interlocking zipper strip, along the panel perimeter (as can be seen with existing hammocks), with mating snaps at the panel perimeter to mate with snaps at a predetermined distance from the panel perimeter or by using string or fabric ties, that secure the panel edge to a loop of compatible tie at a distance from the panel perimeter.

Figure 1B:
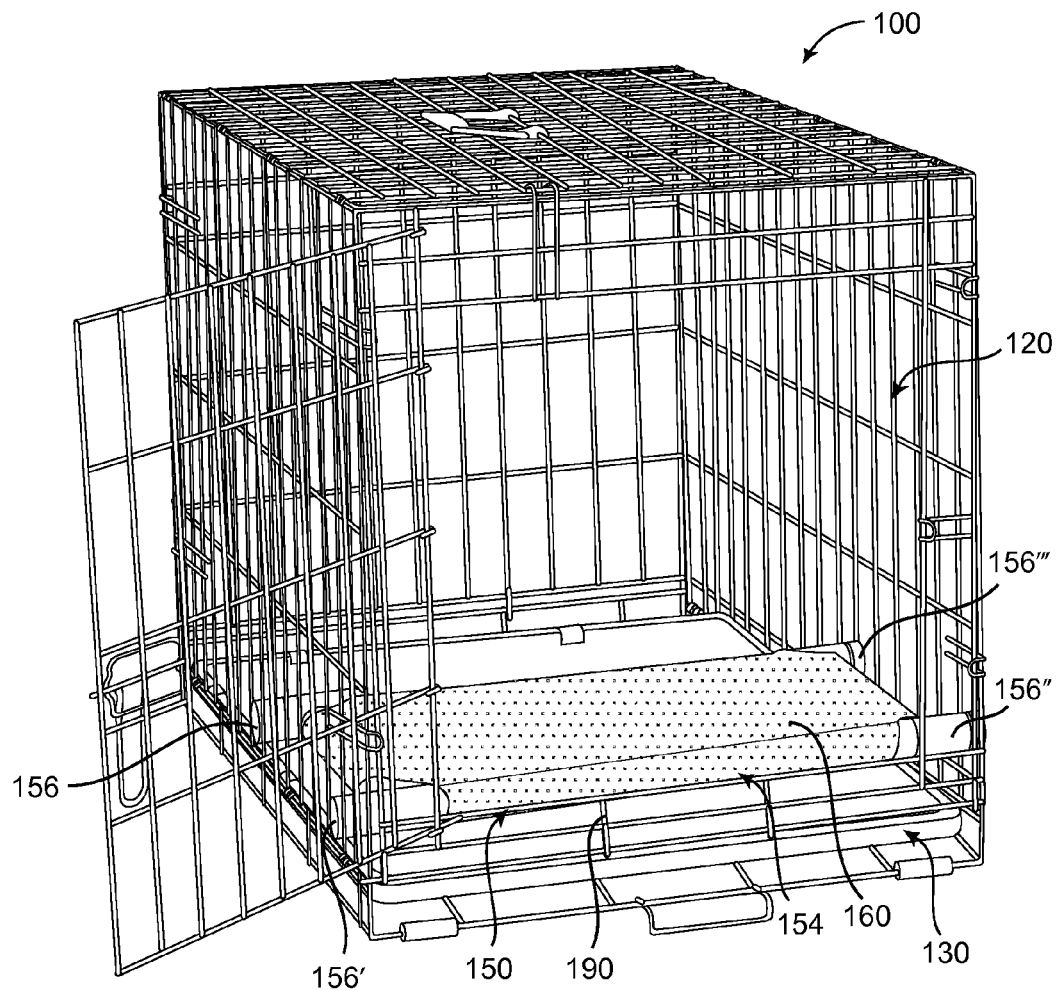
FIG. 1B depicts a perspective view of the full system as seen from the front of the cage.

FIG. 1B depicts a perspective view of the entire system 100, as seen through the cage door 120. The waste tray section 130 is visible on the floor of the cage. The bedding platform 150 sits above the floor of the cage, as indicated at 190. The platform is raised via the projections of the four T pieces (156, 156', 156", 156'''), which sit on the rungs of the cage. The T pieces are attached to the bedding frame 154. The bedding material 160 is wrapped around the bedding frame, creating a sleeping area for the pet.

Figure 1C:
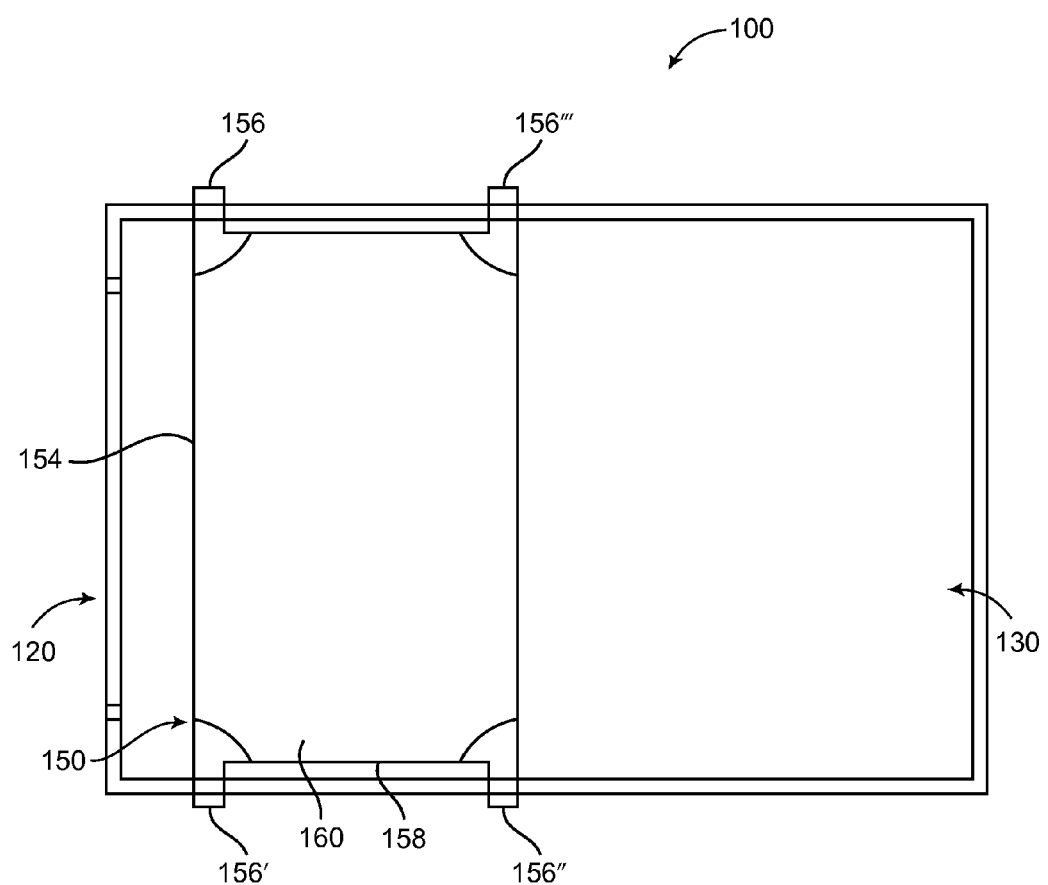
FIG. 1C depicts a top-down view of a simplified version of the system.

Those skilled in the art will recognize that the door location may be altered without significant departure from the depicted apparatus. For instance, the door may be located at the side of the cage enclosure, or at the same end of the cage as the location of the door. Thus, FIGS. 1B and 1C show alternative embodiments of the location of the platform. In a preferred embodiment, the sleeping and play platform is located nearest the door opening 120, so that the elimination area is physically separated by the platform from the outside world accessed through the open door.

FIG. 1C depicts a simplified view of the system 100 as viewed from above. The cage door 120 appears on the left side of the figure. The waste tray section 130 covers the entirety of the floor of the cage. The bedding section 150 is raised above the floor of the cage. The bedding platform is comprised of a frame made up of two parallel side frame members 154, running perpendicular to two shorter parallel end frame members 158. The frame members are all straight pieces of tubing. These four pieces are joined at their connections by four T pieces with frame projections (156, 156', 156", 156'''). The T pieces fit within the outer rungs of the cage, extending just past the outer frame of the pet cage. The bedding frame is wrapped in a bedding material 160, to create the bedding section 150.

Figure 2:
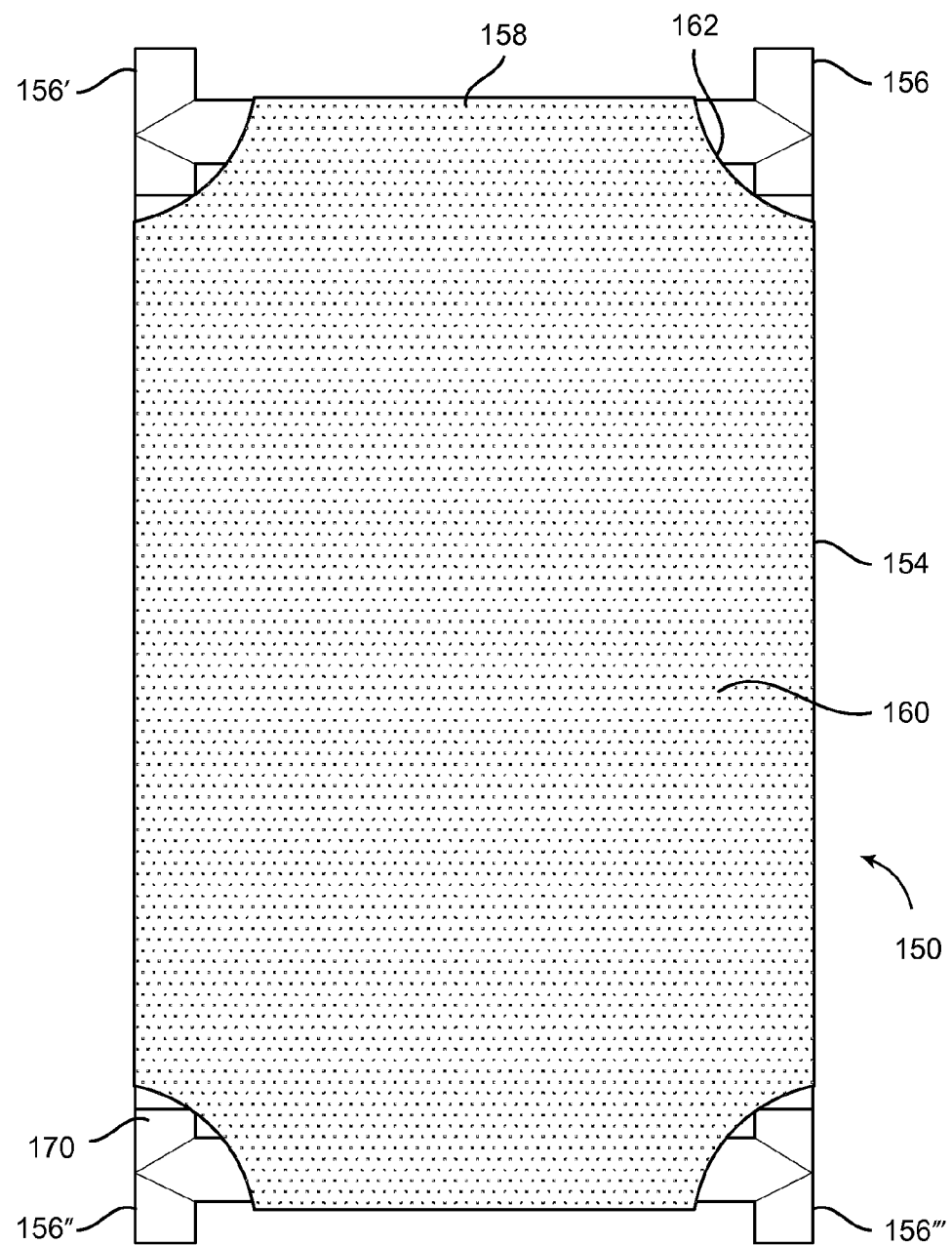
FIG. 2 depicts a view of the bedding and rectilinear frame of the system.

FIG. 2 depicts the bedding section 150 of the system. The rectilinear bedding frame is created through the use of two side frame members 154, which run perpendicular to two shorter end frame members 158. The parallel pieces are joined together using T-shaped pieces 170. The T pieces each have a projection (156, 156', 156", 156'''), which allows the frame to fit within the outer rungs of the cage, thus raising the frame above the floor of the cage. Alternatively, the frame may be raised above the floor of the cage by use of detachable leg pieces inserted into projections 156, 156', 156", and 156''', as depicted in FIG. 3.

The bedding frame is wrapped in a bedding material 160 to create the bedding material for the pet. As described above, several materials may be suitable for use as the bedding material. Four cutouts 162 are present in the bedding material, at each of the four corners of the frame. The cutouts serve to ease assembly of the system, as well as to reduce wear on the bedding material.

Figure 3:
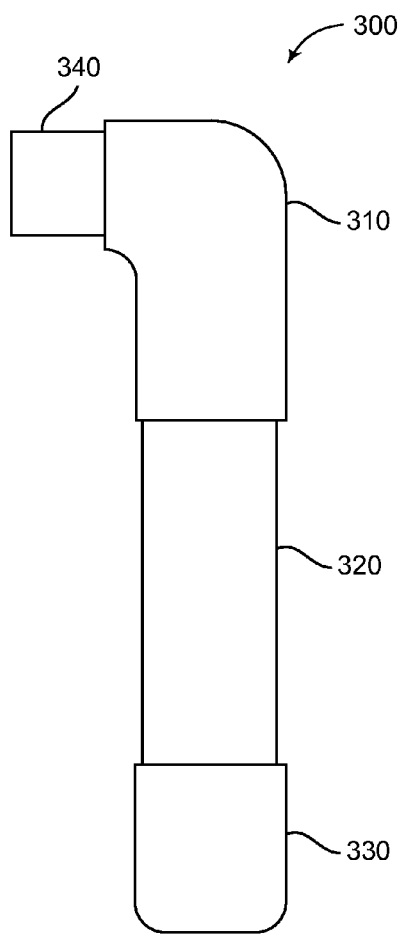
FIG. 3 depicts a detachable leg piece that can be connected to the bedding frame extensions.
Figure 4A:
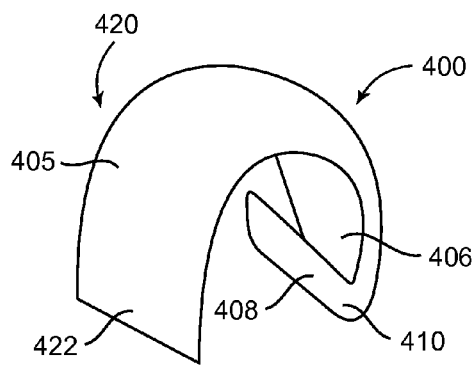
FIG. 4A depicts a perspective view of a metal clip used to secure the absorbent pad.
Figure 4B:
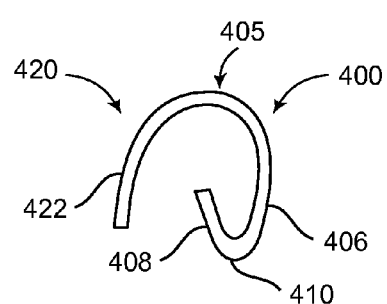
FIG. 4B depicts a side view of a metal clip used to secure the absorbent pad.

FIG. 3 depicts a detachable leg piece 300 that may be used with the system. The piece may be inserted into the projections of the T pieces of the system to raise the bedding platform above the floor of the cage. The piece is comprised of an insert 340, which fits in to the projection of the T piece. The insert is connected to an elbow piece 310, which joins the insert to the leg 320. An end cap 330 is attached to the distal end of the leg, and makes contact with the floor of the cage. In the preferred embodiment, the full detachable leg 300 will have a height of approximately four inches. The height of the legs may be adjusted based on the size of the cage or the size of the pet with which the system is used FIG. 4A depicts a metal retaining clip 400 used to secure the absorbent pad of the waste tray section to the plastic base. A plurality of the retaining clips are used with the system to tightly and effectively secure the elimination pad to the waste tray. Each clip is, in a preferred embodiment, approximately three centimeters wide. The retaining clip is made up of a clip body 405, with a gradual radius tension bend 420, extending from elimination pad holder 422, the tension bend transitioning into a tighter radius tray retention bend 410. The portion of the retaining clip extending beyond the past the tight radius retention bend 410, the tray clip 408, is made to conform to the shape of the edge of the plastic base tray. Clip portion 406 provides spring tension to force tray clip portion 408 into the outside edge of the waste tray. Tray clip portion 408 bears against the waste tray, and as the clip body is urged towards the bottom of the waste tray, elimination pad holder 422 bears against the elimination pad. The elimination pad holder 422 may further be provided with a pad grip, which holds tightly against the absorbent pad. Thus, the clip is able to better hold the absorbent pad in place. The clips are designed to be easily removed and replaced, as the absorbent pad will be replaced each time that it is soiled by the pet. FIG. 4B depicts a side view of the metal clip 400.

Retaining tray clip portion 408 extends beyond the retention bend and conforms to the shape of the edge of the base tray and part of the clip provides spring tension to force the tray clip portion into friction apposition with the outside edge of the waste tray. The waste tray typically will have an extended generally planar bottom surface, extending to the outer edge of the tray, with the outer edge of the tray having an upturned orientation, with an inside edge and an outside edge. Following urging the clip body towards the bottom planar surface of the waste tray, the elimination pad holder bears against an elimination pad arrayed on the waste tray, whereby pressing the tray clip against the waste tray and urging the elimination pad holder towards the interior bottom of the waste tray forces the retaining clip to grip both the inside edge (against the pad) and the outside edge of the tray, and thereby retaining the absorbent pad arrayed upon the waste tray.

The retaining clip as described can utilize a number of additional features to increase the functionality of the pad grip portion of the elimination pad holder. Thus the pad grip can be formed with one or more of upraised teeth, pressed or formed into the pad grip, or alternatively with marginal teeth at the pad grip edge of the retaining clip. The pad grip can alternatively be provided with a non-slip resilient surface, such as rubber, RTV silicone or the like, or with a non skid rough surface, in the manner of coarse sandpaper.

Figure 5A:
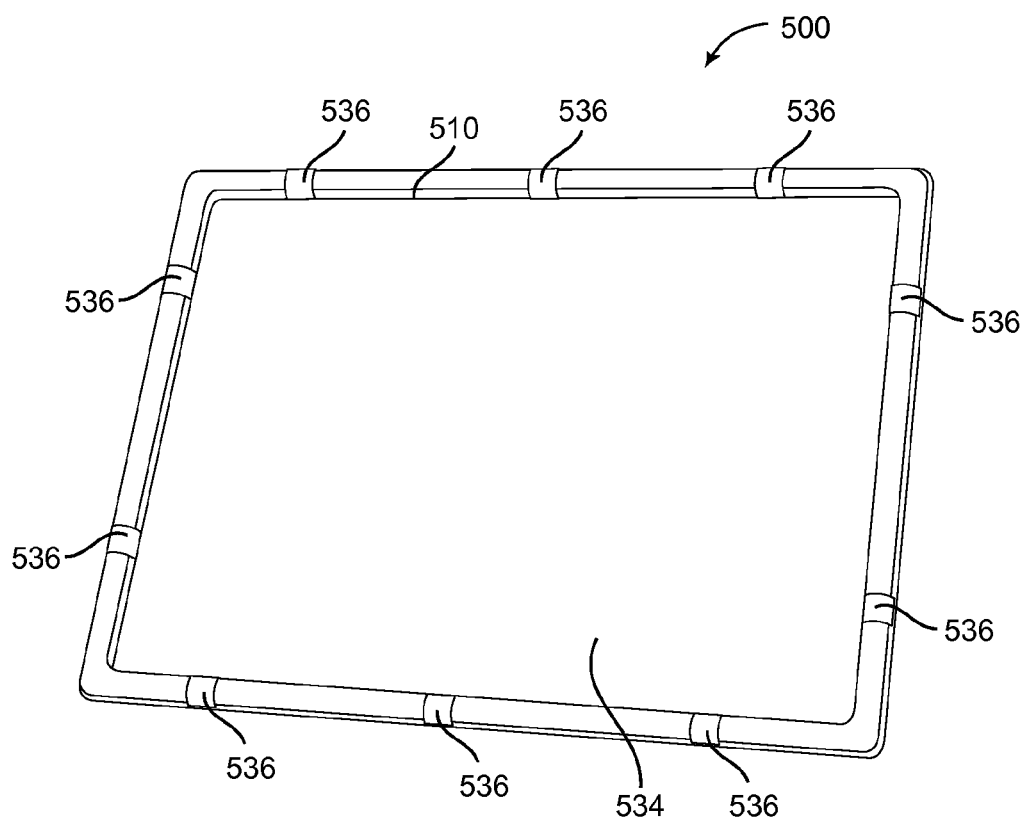
FIG. 5A depicts the waste tray section of the system.

FIG. 5A depicts the full waste tray section 500 of the system. The base tray has a raised edge 510, which accommodates the edge grip of the metal clips 536, and helps to hold the absorbent pad 534 securely in place. In the preferred embodiment, the absorbent pad is made of a combination cotton and paper material, but several materials may be suitable. In this embodiment, the absorbent pad extends only to the base of the raised edge 510 of the tray, though the pad may also extend to the perimeter of the tray, so that the full clip body of the metal clips 536 is touching the pad.

Figure 5B:
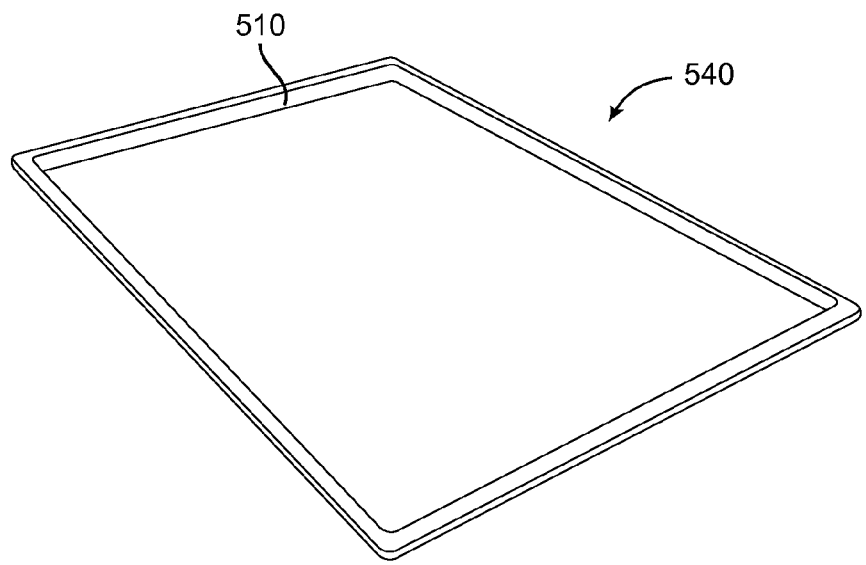
FIG. 5B depicts the plastic base tray of the waste tray section of the system.

FIG. 5B depicts the plastic base tray 540 of the waste tray section. The tray should be made of a hard plastic material, that is stiff and can withstand extended wear. The material should also be easily washable, such as by spraying with a hose, or with a variety of household cleaners. The tray is designed with a raised edge 510 to accommodate the shape of the metal clips.

Figure 6:
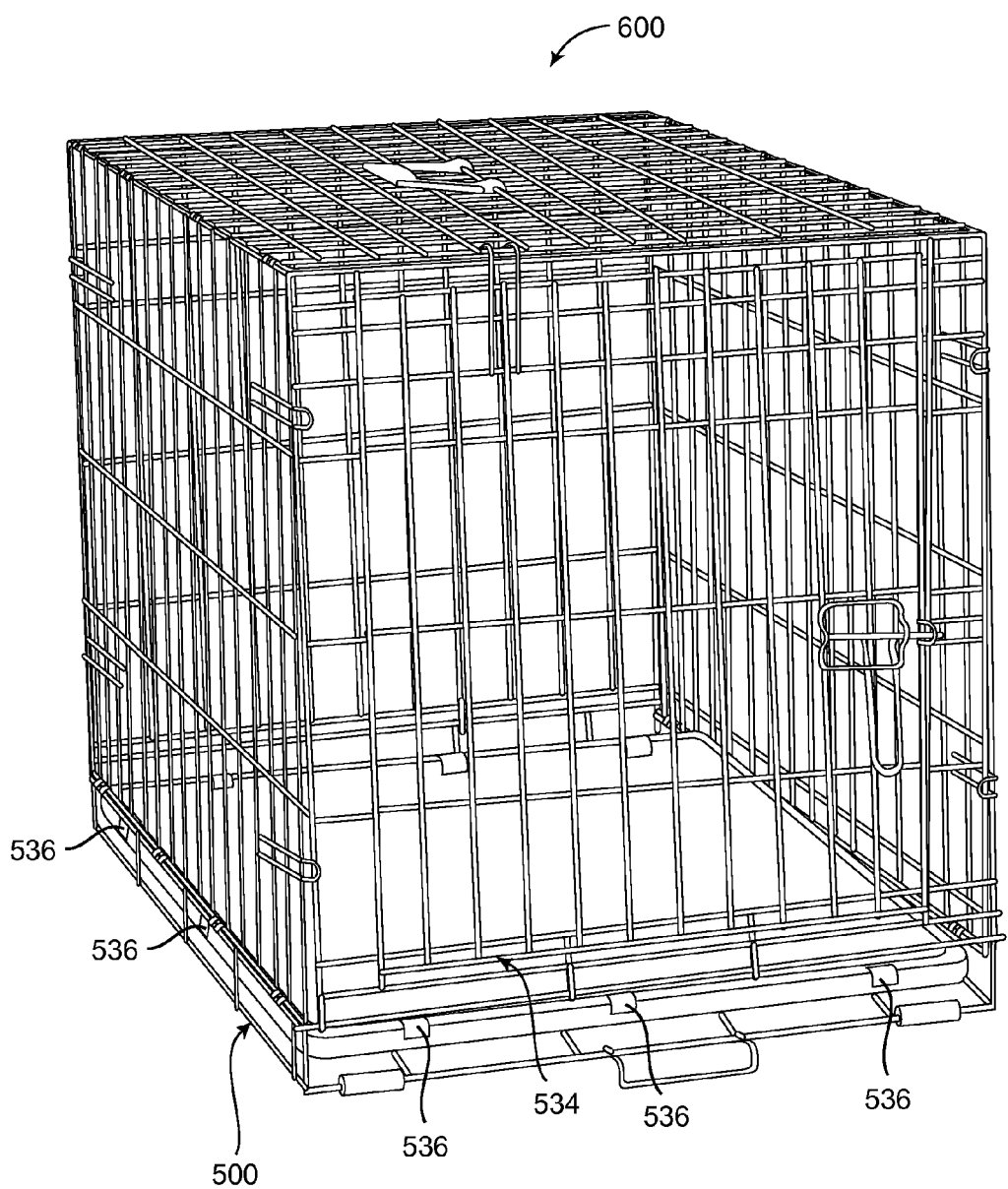
FIG. 6 depicts a perspective view of the cage containing only the waste tray section of the system.

FIG. 6 depicts a perspective view of the pet cage 600 containing only the waste tray section of the system. The plastic base tray 500 sits on the floor of the cage. The absorbent pad 534 is held to the base tray by a plurality of metal clips 536. The waste tray section may be easily removed from the system, to facilitate removal of the clips and absorbent pad when the pad has been soiled by the pet.

The above-described clip for retaining the absorbent elimination pad on the waste tray as described comprises a clip body with a gradual radius tension bend extending from an elimination pad holder. When the user urges the clip body towards the bottom of the waste tray, the elimination pad holder bears against an elimination pad that is spread across (arrayed on) the waste tray. Thus, pressing the tray clip against the waste tray and urging the elimination pad holder towards the interior bottom of the waste tray retains the absorbent pad arrayed upon the waste tray. When a number of clips are installed around the perimeter of the waste tray, the elimination pad is very effectively retained in place.

In an alternative embodiment, The retaining clip further comprises an elimination pad holder with a pad grip formed of one or more of upraised teeth, for instance, embossed in the holder surface, marginal teeth along the edge near 422, or installing a non-slip resilient surface, i.e., rubber or the like, or a non skid rough surface, such as abrasive paper, on the interior of the retaining clip. Alternatively the pad grip could be installed on a portion, or the entire interior of the retaining clip.

The above-disclosed system is also effective for use with a new method of training dogs. If utilized as described below, the above-described system can be used with a new house-training method. For many years there have been generally two strategies for training young dogs to perform bodily functions in an acceptable location, namely, out of doors. One strategy has been repeated conditioning to eliminate out of doors. Since young dogs cannot typically delay elimination for an extended period of time, typical instructions are to the effect of "take the animal outdoors every hour until the animal is 8 weeks old. Take the animal outdoors every 2 hours until the animal is ten weeks old," and so forth, until the animal is able to restrain elimination functions until it is in an appropriate location for elimination.

A second alternative strategy is in effect a strategy to create an animal "den," and relies on a purported animal instinct that dogs instinctively will not soil their immediate sleeping area. Such a "confinement" strategy may be misplaced because wild dog pups may in fact soil the sleeping area, followed by the mother removing the feces. When utilizing the confinement strategy, instructions for the method usually are to the effect that the young animal's sleeping area is just large enough for the animal to stretch and turn around. Some argue that such small confined areas are cruel for a young animal to endure.

Both of the aforementioned strategies are generally ineffective when the owners of young animals are not capable of providing frequent attention to the young animal, especially in the early stages of house training. For instance, very few dog owners are able to walk the animal outside every hour for a period of time extending for a period of weeks. Thus, if the interval between allowing the animal opportunities to eliminate outdoors (the "relief interval") is too long, the animal is forced to eliminate in the cage, disrupting the training method, and desensitizing the animal to contact with feces and urine. The result is that such training may be ineffective, and in fact counter productive for effective house training.

In addition, most young dogs cannot effectively control elimination until about 12 weeks of age. If an animal is weaned and separated from the mother at 7 weeks, the result is that for five weeks, the animal may develop ingrained undesired behavior. Furthermore, if the only available outdoor areas are frequented by other dogs, the puppy may be forced to utilize heavily trafficked areas for outdoor elimination. Contact with the elimination products of other animals may present a danger of infection of the puppy with common puppy diseases at a time when the young animal has not completed its vaccinations and other preventative care measures.

The present system and method provide a more effective manner of house training dogs, in a compact cage system. The system provides a loft area functioning as sleeping quarters and for enforcing separation from an elimination area. Such separation is an improvement over existing cage training methods because the enforced separation reinforces desirable behavior patterns, and rapidly develops reflex actions in the animal with respect to elimination.

Once the animal is free to roam the area outside of the caged enclosure, the reinforced behavior leads to the animal indicating a need to eliminate, by approaching the open cage and the absorbent pad. Thus, the method provides for leaving the cage door open when the animal is out of the cage, so that the animal may return to indicate a need to eliminate.

The system and apparatus also rely on innate dog behavior, in that puppies have a desire to rest and play on an elevated platform. The method reinforces this behavior by providing a toy or scented blanket on the raised platform, encouraging play and sleeping on the platform. The method provides a confined space in the form of a cage, a physically separated elevated sleeping and play area, and access to a designated elimination area. The elimination area is provided with an elimination surface that absorbs urine and moisture from feces so that the elimination products do not contaminate the platform. The elimination area has a tray supporting the elimination surface, and tray clips that restrain and retain the elimination surface on the tray. The tray can be easily removed and the surface restored. The clips are an important feature of the system, so that scratching behavior of the animal after elimination does not dislodge the absorbent elimination surface.

The method for training a dog as disclosed herein typically would provide for supplying instructional media describing for the use of the method with a user dog in need of house training. Such instructional media could be in the form of a DVD, CD-ROM or flash memory containing a number of chapters of audio, video, text, or audio-visual display. Alternatively, the media could be provided via internet streaming, for download, or in a subscription live or stored media seminar format.

When implementing the method, a user can supply their own animal cage, or purchase the cage with various other components of the method. Typically the cage, either supplied, or previously procured by the user would provide for an enclosure comprising a cage frame, a door, generally vertical side panels and at least a cage bottom panel, but possibly also a cage top panel. The side panels provide perforations, whether from a wire formed cage panel, or through apertures in a plastic or wooden cage panel. In essence the cage enclosure provides a cage interior with restricted access. Nonetheless, the cage enclosure is not physically subdivided by vertical barriers into rooms, or subenclosures. When using the method, the dog is inside the cage enclosure, in the nature of a den with a single room, but a sleeping/play platform. The sense of an enclosed den can be reinforced by providing a cage cover, preferably in the form of a fabric shroud that covers and darkens the cage enclosure above the cage bottom.

As described, the method utilizes a platform bed comprising a rectilinear frame, a bedding panel supported by the frame, and frame projections for positioning the platform bed within the enclosure. The platform bed forms a sleep and play area separate from an elimination area. On the bottom of the cage is a training tray of generally planar conformation, with a bottom and upraised perimeter edges, and an absorbent elimination pad covering the bottom and extending to the perimeter edges. The absorbent pad is secured to the tray by a plurality of pad clips, with the training tray covered by the elimination pad and thus forming an elimination area. In a preferred embodiment, the pad clips, i.e. pad retaining clips, as described in FIG. 4, are installed so there is at least one pad clip per edge of the training tray, and more preferably two clips per edge, or the clip being spaced at approximately 30 cm intervals or 15 cm intervals about the perimeter of the training tray.

The trainer allows the dog to access the cage interior with the platform and become comfortable with the environment inside the cage. In the early stages of house training, the animal's activity, when not closely supervised, is controlled by restricting the dog's movements to the cage interior when access to an acceptable elimination location is not available. When the dog cannot eliminate outdoors or at an other acceptable location, or is not under close supervision, the dog is inside the cage. The goal of the training system is to condition the dog to eliminate in an acceptable elimination location.

When the user, i.e. trainer, is not available to supervise the young untrained dog, the animal is allowed to eliminate on the elimination pad. Importantly the trainer removes and replaces the elimination pad whenever the elimination pad becomes soiled by elimination products of the dog. As the dog becomes conditioned to restrict elimination to the outdoors, or to the cage interior, the trainer can allow short supervised intervals of allowing the dog to leave the cage interior, and return to the cage interior when the dog has an urge to eliminate. In an intermediate step, the platform bed can be removed from the cage and placed on an absorbent pad located away from the cage. As the dog becomes conditioned to restrict elimination to the outdoors, instead of leaving the platform bed inside the cage, or removing the platform bed from the cage, and positioning the platform bed on top of the absorbent pad, the trainer can remove the absorbent pad to an outdoor location, to further encourage the dog to be conditioned to eliminate outdoors.

Thus, initially the platform bed is positioned inside the enclosure, and installed so that the platform bed is raised above the upper surface of the elimination pad that is arrayed across the surface of the training tray. This allows safe confinement of the dog inside the enclosure and provides a sleep and play area physically distinct from an elimination area. This sequential method allows the dog to be more effectively conditioned for house training than any existing method.

A preferred embodiment for marketing the system is an apparatus in the form of a kit for providing the outfitting of an animal cage for use with a training system comprising a bed with a rectilinear frame. Most commonly the frame further comprises side rails, end rails, frame projections and corner connectors. The platform bed can be provided complete with a fabric bedding panel, and accompanied with at least one absorbent pad and a plurality of pad clips, such as four, eight, or sixteen. In almost all cases the kit will further provide a graphic assembly instruction set, and an instructional media describing use of the kit in the above described method of training a dog.

A preferred embodiment is for the kit to include a fabric bedding panel securable to the frame with one or more of hook-loop fasteners, zippers, snaps or ties. Alternatively, the kit may provide the bedding panel already secured to the frame. The kit may also include alternative frame end supports and frame leg pieces compatible with the corner connectors. Thus, the kit provides first for using frame end supports, for installation and support in loft format inside the cage enclosure, and later using the alternative leg pieces inserted into the corner connectors. The platform bed can then be temporarily removed from the enclosure and placed outside the cage enclosure on the absorbent pad to form a lofted platform bed for use by a dog as the dog is better conditioned to eliminate in an acceptable location.

It is envisioned by the disclosure that an alternative kit allows for a purchaser to use the kit with an existing animal cage. As cage sizes for similarly sized dogs are generally standard, the kit is compatible with cages and enclosures previously owned by consumers. The platform bed is compatible with all cages that provide for appropriate perforations, or those that can accommodate the platform's leg extension pieces. In most cases the kit can be shipped in a flat box, which will contain all necessary components of the kit. A single flat box for shipping uses a minimal amount of space, making the kit easier to transport, and reducing the shipping costs associated with the kit.

While the invention has been described with reference to preferred embodiments, those skilled in the art will understand that various changes may be made and equivalents may be substituted for elements thereof without departing from the scope of the invention. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

The invention claimed is:

1. A system for conditioning dogs comprising
   a) an enclosure comprising a cage frame, a door, generally vertical side panels and a bottom, said side panels providing perforations;
   b) a platform bed comprising a rectilinear frame, a bedding panel supported by the frame, and frame projections for positioning the platform bed within the enclosure, said platform bed forming a sleep and play area; and
   c) a training tray of generally planar conformation, with a bottom and upraised perimeter edges, and an absorbent elimination pad covering the bottom and extending to the perimeter edges, said absorbent pad secured to the tray by a plurality of pad clips, said training tray covered by the elimination pad forming an elimination area;
   whereby, the platform bed is positioned inside the enclosure, and installed so that the platform bed is raised above the upper surface of the elimination pad arrayed upon the surface of the training tray and allowing confinement of a dog inside the enclosure and thereby providing a sleep and play area physically distinct from an elimination area that allows the dog to be more effectively conditioned for house training.

2. The system of claim 1 further comprising a bed wherein the rectilinear frame is formed of tubing, and side frame members and end frame members of the rectilinear frame are joined by corner connectors, and a support frame portion projects from the corner connector to pass through perforations in the side panel, the bedding panel further comprises bedding panel corner cuts, whereby the bed is supported as a platform within the cage by support frame portions lodging in the cage side panel perforations, and supporting the bedding panel within the cage enclosure.

3. The system of claim 2 wherein the tubing forming the frame is formed from one or more of metal, plastic, steel, aluminum, composite material, polyvinyl chloride polymer, PVC pipe, and conduit.

4. The system of claim 3 wherein the tubing forming the frame is formed from PVC pipe.

5. The system of claim 1 wherein the bedding panel is formed of fabric that wraps around the frame, provides corner cuts and is secured to the frame.

6. The system of claim 5 wherein the bedding panel is secured to the frame by one or more of sewed seams, hook-loop fasteners, zippers, snaps or ties.

7. The system of claim 5 wherein the bedding panel is formed of fabric that wraps around the rectilinear frame and is secured to the rectilinear frame by hook-loop fasteners.

8. The system of claim 1 further comprising a platform bed wherein the rectilinear frame is formed of tubing, and side frame members and end frame members of the rectilinear frame are joined by corner connectors, and a detachable leg projects from the corner connector to rest on the tray, the bedding panel further comprises bedding panel corner cuts, whereby the bed is supported as a platform within the cage by legs resting on the tray in the cage bottom, and supporting the bedding panel within the cage enclosure.

9. The system of claim 8 further comprising a platform bed that can be removed from a cage enclosure and placed outside the cage enclosure to form a lofted platform bed for use by a dog.

10. The system of claim 1 further comprising a kit for providing the outfitting of an animal cage for use with a training system comprising a bed with a rectilinear frame, said frame further comprising side rails, end rails, frame projections and corner connectors, a fabric bedding panel, at least one absorbent pad, a plurality of pad clips, a graphic assembly instruction set, and an instructional media describing use of the kit in training a dog.

11. The kit of claim 10 further comprising a fabric bedding panel securable to the frame with one or more of sewed seams, hook-loop fasteners, zippers, snaps or ties.

12. The kit of claim 10 further comprising leg pieces compatible with the corner connectors.

13. The kit of claim 12 further comprising leg pieces inserted into the corner connectors, and placing the platform bed outside the cage enclosure on the absorbent pad to form a lofted platform bed for use by a dog.

14. The system of claim 1 further comprising a bed wherein the rectilinear frame is formed of tubing, and side frame members and end frame members of the rectilinear frame are joined by corner connectors, and a support frame portion projects from the corner connector to pass through perforations in the side panel, the bedding panel further comprises a fabric bedding panel wrapped around the frame members, secured to the frame by hook loop fasteners and bedding panel corner cuts, whereby the bed is supported as a platform within the cage by support frame portions lodging in the cage side panel perforations, and supporting the bedding panel within the cage enclosure.

15. The system of claim 1 wherein the clip for retaining the absorbent pad to the tray further comprises a clip body with a gradual radius tension bend extending from an elimination pad holder said tension bend transitioning into a tighter radius tray retention bend, a tray clip extending beyond the retention bend and conforming to the shape of the edge of the training tray, and a clip portion providing spring tension to force the tray clip portion into friction apposition with an outside edge of the training tray, and following urging the clip body towards the bottom of the training tray, the elimination pad holder bears against an elimination pad arrayed on the training tray such that said elimination pad extends over the entire upper surface of the training tray and across the upper outside edge of the training tray, whereby pressing the tray clip against the outside edge of the training tray and urging the elimination pad holder towards the interior bottom of the training tray retains the absorbent pad arrayed upon the training tray.

16. A method of training a dog comprising
a) instructional media describing for the use of the method with a user dog in need of house training;
b) an enclosure comprising a cage frame, a door, generally vertical side panels and a bottom, said side panels providing perforations, said enclosure providing a cage interior with restricted access;
c) a platform bed comprising a rectilinear frame, a bedding panel supported by the frame, and frame projections for positioning the platform bed within the enclosure, said platform bed forming a sleep and play area;
d) a training tray of generally planar conformation, with a bottom and upraised perimeter edges, and an absorbent elimination pad covering the bottom and extending to the perimeter edges, said absorbent pad secured to the tray by a plurality of pad clips, said training tray covered by the elimination pad forming an elimination area;
e) allowing the dog to access the cage interior with the platform;
f) restricting the dog's movements to the cage interior when access to an acceptable elimination location is not available;
g) allowing the dog to eliminate in an acceptable elimination location;
h) removing and replacing the elimination pad when the elimination pad becomes soiled by elimination products of the dog; and
i) as the dog becomes conditioned to restrict elimination to the outdoors, or to the cage interior, allowing the dog to leave the cage interior, and return to the cage interior when the dog has an urge to eliminate, whereby, the platform bed is positioned inside the enclosure, and installed so that the platform bed is raised above the upper surface of the elimination pad arrayed upon the surface of the training tray and allowing confinement of a dog inside the enclosure and thereby providing a sleep and play area physically distinct from an elimination area that allows the dog to be more effectively conditioned for house training.

17. The method of claim 16 further comprising a kit for outfitting an existing animal cage.

18. The method of claim 16 further comprising the step
j) as the dog becomes conditioned to restrict elimination to the outdoors, instead of leaving the platform bed inside the cage, removing the platform bed from the cage, and positioning the platform bed on top of the absorbent pad, and as the dog becomes further conditioned, removing the absorbent pad to the outdoors, to further encourage the dog to be conditioned to eliminate outdoors.

19. A clip for retaining an absorbent pad on a tray comprising a clip body with a gradual radius tension bend extending from an elimination pad holder said tension bend transitioning into a tighter radius tray retention bend, a tray clip extending beyond the retention bend and conforming to the shape of the edge of a base tray, and a clip portion providing spring tension to force the tray clip portion into friction apposition with an outside edge of the waste tray, and following urging the clip body towards the bottom of the waste tray, the elimination pad holder bears against an elimination pad arrayed on the waste tray, whereby pressing the tray clip against the waste tray and urging the elimination pad holder towards the interior bottom of the waste tray retains the absorbent pad arrayed upon the waste tray.

20. The clip of claim 19 further comprising an elimination pad holder with a pad grip formed of one or more of upraised teeth, marginal teeth, a non-slip resilient surface, and a non skid rough surface.

* * * * *